United States Patent
Raizen et al.

(10) Patent No.: US 8,751,828 B1
(45) Date of Patent: Jun. 10, 2014

(54) SHARING ENCRYPTION-RELATED METADATA BETWEEN MULTIPLE LAYERS IN A STORAGE I/O STACK

(75) Inventors: Helen Raizen, Jamaica Plain, MA (US); Michael Emerald Bappe, Loveland, CO (US); Edith Epstein, Arlington, MA (US); Atul Kabra, New Delhi (IN); Cesareo Contreras, Northbridge, MA (US); Assaf Natanzon, Ramat Gan (IL); Harold Martin Sandstrom, Belmont, MA (US)

(73) Assignee: EMC Corporation, Hopkinton, MA (US)

( * ) Notice: Subject to any disclaimer, the term of this patent is extended or adjusted under 35 U.S.C. 154(b) by 543 days.

(21) Appl. No.: 12/977,789

(22) Filed: Dec. 23, 2010

(51) Int. Cl.
*G06F 12/14* (2006.01)

(52) U.S. Cl.
USPC ........... 713/193; 380/278; 711/113; 711/114; 711/164

(58) Field of Classification Search
CPC ... H04L 9/0827; H04L 9/0877; H04L 9/0819; G06F 21/71; G06F 21/78; G06F 12/14; G06F 3/06; G06F 9/54; G06F 21/6218; G11B 20/0013; G11B 20/00188; G11B 20/00217
USPC ........... 380/278; 713/193; 711/113, 114, 164; 719/321
See application file for complete search history.

(56) References Cited

U.S. PATENT DOCUMENTS

| | | | |
|---|---|---|---|
| 7,747,799 B2 | 6/2010 | Nakagawa et al. | |
| 8,166,314 B1 * | 4/2012 | Raizen et al. | 713/193 |
| 8,416,954 B1 * | 4/2013 | Raizen et al. | 380/277 |

OTHER PUBLICATIONS

RSA Security Inc.: PowerPathTM Encryption with RSA, RSA Laboratories, 2008, pp. 1-16, (retrieved from the Internet at (>http://www.emc.com/collateral/software/white-papers/rkmpp-sb-0808-lowres.pdk<).*
Bowlin, et al., "EMC PowerPath Encryption with RSA: Delivery Host-Based Encryption to Disk," Slides from EMC World, Orlando, May 2009.
Raizen, et al., U.S. Appl. No. 12/242,638, filed Sep. 30, 2008.
Raizen, et al., U.S. Appl. No. 12/242,690, filed Sep. 30, 2008.
Raizen, et al., "Preserving LBA Information Between Layers of a Storage I/O Stack for LBA-Dependent Encryption," U.S. Appl. No. 12/977,971, filed Dec. 23, 2010.
Sandstrom, et al., "EMC PowerPath and PowerPath/VE: What's New in 2010," Slides from EMC World, Boston, May 2010.

* cited by examiner

*Primary Examiner* — Eleni Shiferaw
*Assistant Examiner* — Paul Callahan
(74) *Attorney, Agent, or Firm* — BainwoodHuang

(57) ABSTRACT

A host in an encrypted data storage system sends encryption metadata associated with an encrypted logical volume (LV) from a key controller module to an encryption endpoint via a storage I/O stack. The encryption metadata identifies an encryption key and encrypted regions of the LV, and the sending results in establishment of one or more shared associations between the key controller module and the encryption endpoint which associates the encrypted LV with the encryption metadata for the encrypted LV. A data storage operation is performed on the encrypted LV by sending a data storage command from the key controller module to an encrypted region of the encryption endpoint via the storage I/O stack. The encryption endpoint uses the encryption metadata associated with the encrypted LV to cryptographically process data of the data storage operation.

21 Claims, 8 Drawing Sheets

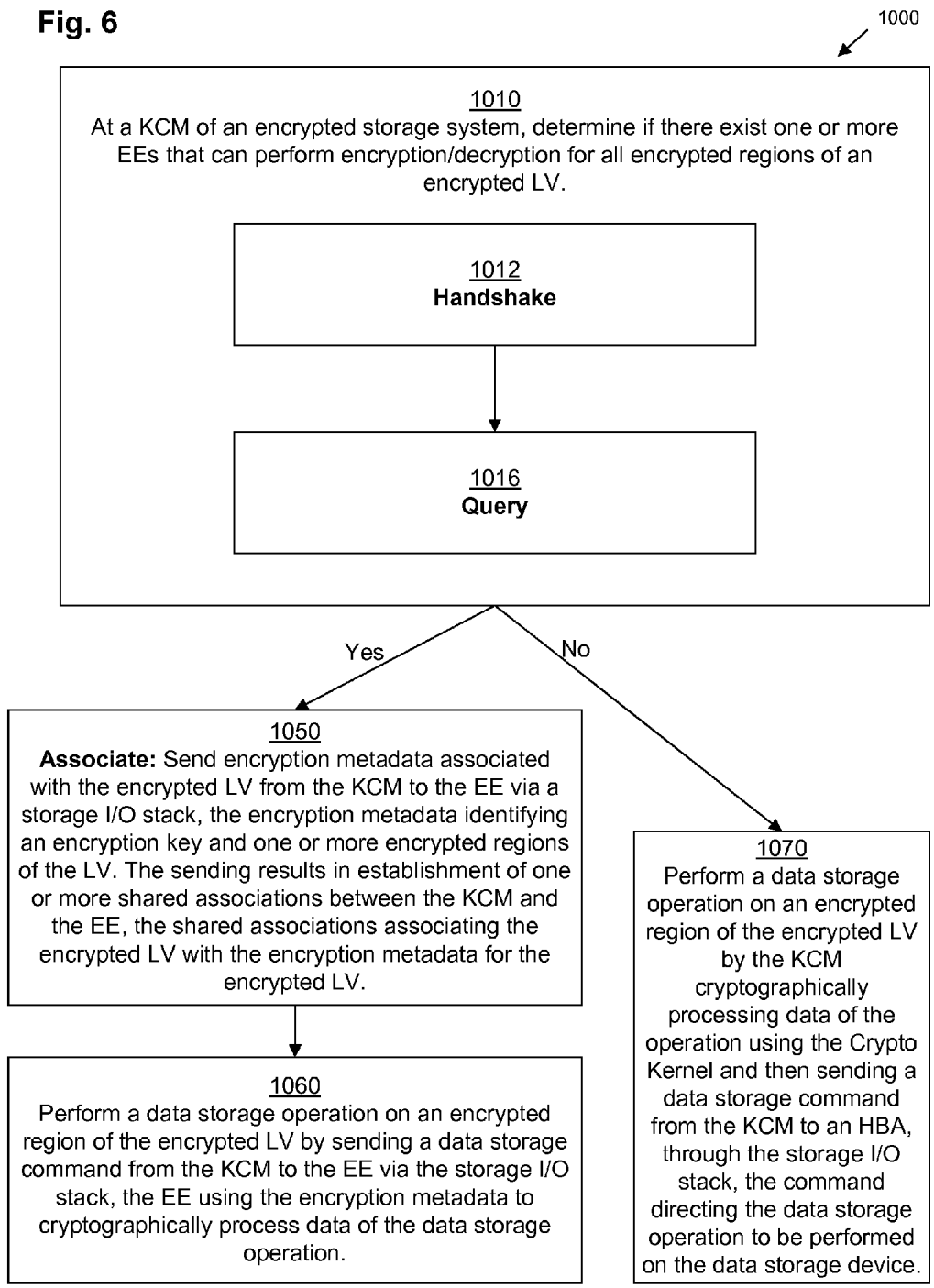

Fig. 7

| Byte | Fields |
|---|---|
| 0-7 | Protocol Signature |
| 8-15 | Checksum |
| 16-19 | Version |
| 20-23 | Reserved |
| 24-27 | Associate Opcode |
| 28-31 | DEK Management protocol Response Status |
| 32-39 | DEK Management protocol Endpoint ID |
| 40-47 | Key Controller Handle |
| 48-55 | Association Handle(8 bytes) |
| 56-59 | Offset to Key Blob |
| 60-63 | Offset to Key ID |
| 64-67 | Offset to Application Info (e.g. IV) |
| 68-71 | Offset to LUN map |
| Variable Length Data | Key blob length (4 bytes) |
| | Key blob type (1 byte) |
| | Reserved (3 byte) |
| | Key data version (1 byte) |
| | Key data length (1 byte) |
| | Key data algorithm (1 byte) |
| | Key data mode (1 byte) |
| | Key data (64 bytes array) |
| | ... |
| | Application info size |
| | Key ID Length (4 byte) |
| | Key ID (The length is given by Key ID Length) |
| | Application Info |
| | Data unit Size (4 bytes) |
| | (4 bytes) LUN Map Count (n) |
| | (8 bytes) Starting LBA Entry[0] |
| | (8 bytes) Number of Blocks [0] |
| | ... |
| | (8 bytes) Starting LBA Entry[n-1] |
| | (8 bytes) Number of Blocks [n-1] |
| | ... |

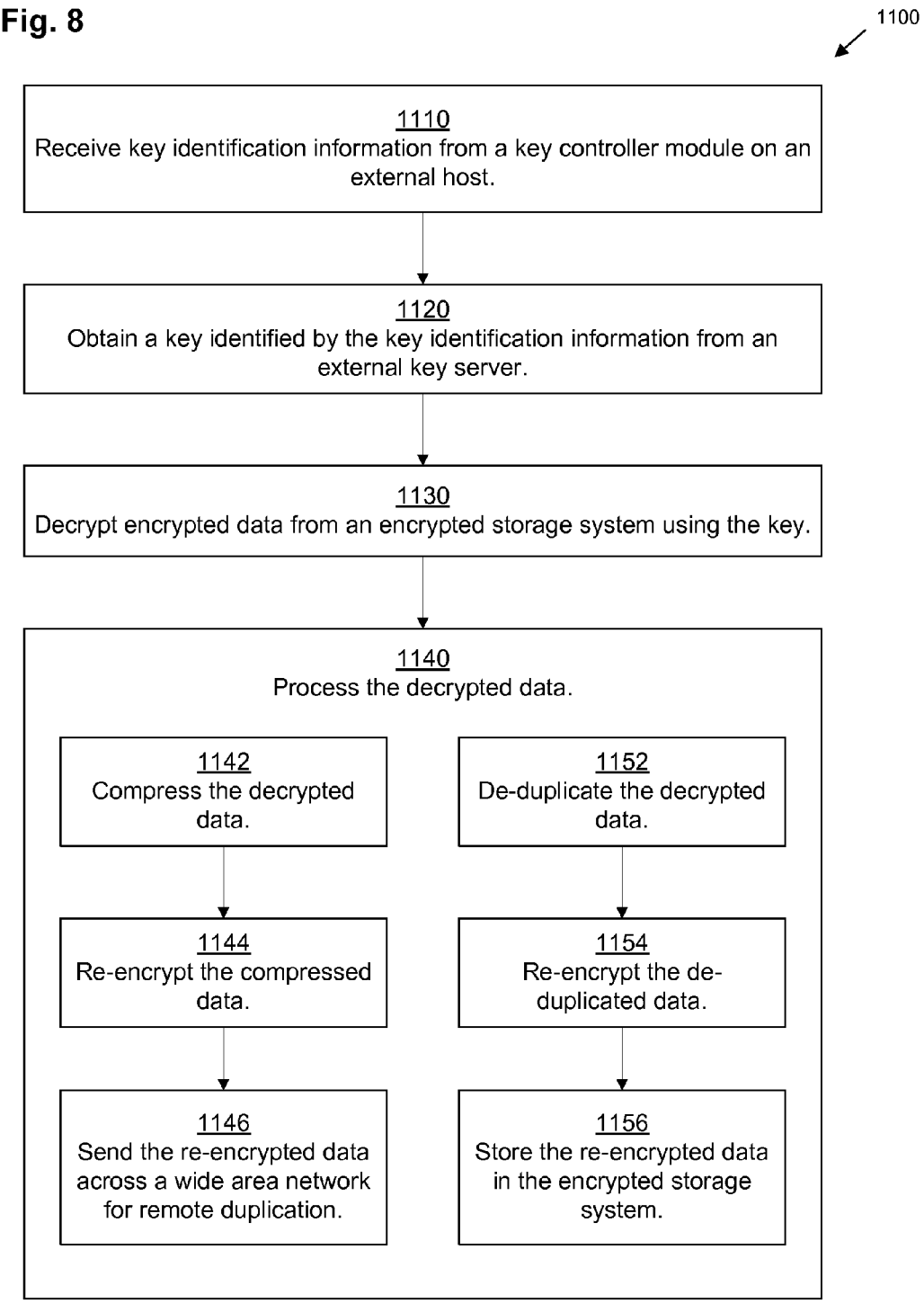

SHARING ENCRYPTION-RELATED METADATA BETWEEN MULTIPLE LAYERS IN A STORAGE I/O STACK

BACKGROUND

In computer systems, it is sometimes desirable to encrypt some or all of the data stored in storage devices in the system. In some arrangements, data is encrypted in an I/O filter driver running on a host of the computer system. In some configurations, the I/O filter driver is configured to use a key securely provided by a network key server so that multiple hosts within a security domain can securely access the same data.

SUMMARY

The above-described approach to encryption in computer systems may not be entirely optimal, because encryption is a cycle-intensive task, so performing the encryption in a software filter driver on the host can cause slow performance. It may be desirable to offload data encryption tasks to specialized hardware devices which operate under the control of supervisory software components. In other systems, there may be other system components that perform data encryption tasks under such supervision. In these kinds of systems it is necessary for such data encrypting components to obtain encryption "metadata", such as data encryption keys, for use in the data encryption operations.

Embodiments of the present invention are directed to techniques for sharing encryption-related metadata between layers of a storage I/O stack so that the metadata can be effectively transferred thereby to specialized hardware devices or other encrypting components in a computer system. The disclosed techniques can provide for efficient and secure passing of encryption information among system elements to enable a variety of system functions.

A host in an encrypted data storage system sends encryption metadata associated with an encrypted logical volume (LV) from a key controller module to an encryption endpoint via a storage I/O stack. The encryption metadata at least identifies an encryption key and encrypted regions of the LV, and the sending results in establishment of a shared association between the key controller module and the encryption endpoint which associates the encrypted LV with the encryption metadata for the encrypted LV. A data storage operation is performed on an encrypted region of the encrypted LV by sending a data storage command from the key controller module to the encryption endpoint via the storage I/O stack. The encryption endpoint uses the encryption metadata associated with the encrypted LV to cryptographically process data of the data storage operation.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 6 depicts an example method according to one embodiment of the invention.

FIG. 7 depicts an example Associate Command Block according to one embodiment of the invention.

FIG. 8 depicts an example method according to one embodiment of the invention.

DETAILED DESCRIPTION

Figure 1:
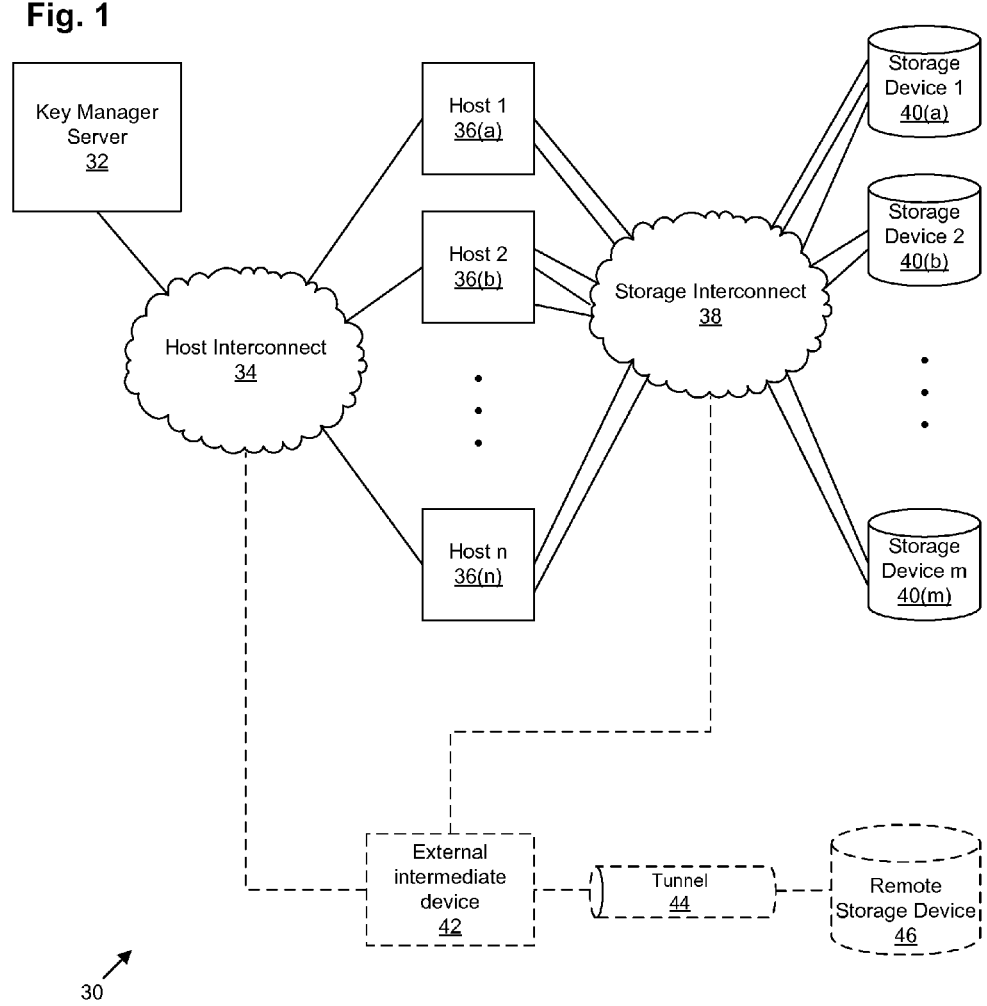
FIG. 1 depicts an example system for use in practicing various embodiments of the invention.

FIG. 1 depicts an example distributed computer system 30 (capable of performing as an encrypted data storage system) for use in performing various embodiments of the invention. System 30 includes a key manager server 32, a host interconnect 34, and one or more hosts 36 (depicted as hosts 36(a), 36(b), . . . , 36(n)). Key manager server 32 and hosts 36 connect to each other via a host interconnect 34. The hosts 36 also connect to storage devices 40 (depicted as storage devices 40(a), 40(b), . . . , 40(m)) via a storage interconnect 38. In some embodiments, the host interconnect 34 and the storage interconnect 38 are combined. One or more external intermediate devices 42 may also attach to host interconnect 34 and storage interconnect 38. Certain types of external intermediate devices 42 may work in conjunction with a WAN tunnel 44 and one or more remote storage devices 46, as described further below.

In operation, the hosts 36 execute application programs that utilize the storage devices 40 for non-volatile data storage. The storage interconnect 38 may employ a storage-oriented protocol such as iSCSI or Fibre Channel to enable block-oriented read and write commands and the accompanying data to be transferred between the hosts 36 and storage devices 40. Additionally, the system 30 provides selective encryption of storage data by the hosts 36 (and potentially the external intermediate device 42). The key manager server 32 and host interconnect 34 provide support for the data encryption function as described in more detail below.

Key manager server 32 provides key manager functionality, i.e., the generation, protection, storage, replacement, and elimination of data encryption keys and related data that are used in data encryption/decryption operations. In one embodiment, key manager server 32 is a server appliance. One example of a key manager server 32 usable in some embodiments is the RSA Key Manager appliance manufactured by EMC Corp. of Hopkinton, Mass. It should be understood that this is by way of example only; other products may also serve as the key manager server 32.

Key manager server 32 and hosts 36 connect to each other via host interconnect 34. Host interconnect 34 may be, for example, a network, such as a local area network (LAN) or a wide area network (WAN). Host interconnect 34 may also be realized by a collection of one or more switches interconnecting key manager server 32 and hosts 36.

Hosts 36 are computers executing applications that store data on the data storage devices 40. In addition to connecting to the host interconnect 34, each host 36 also connects to the storage interconnect 38, typically via a plurality of independent connections. In one embodiment, the hosts 36 employ a multipathing function which establishes and utilizes multiple paths from a given host 36 to a given storage device 40, which can provide higher performance as well as redundancy for greater availability. Further detail regarding hosts 36 is provided below in connection with FIGS. 2 and 3.

The storage interconnect 38 can be any type of network or input/output (I/O) bus capable of interconnecting storage devices 40 with host computers 36. In some embodiments, the storage devices 40 and host 36 are interconnected in a manner such that, to the operating systems running on the hosts 36, the storage devices 40 appear as locally attached, but this is not required for the invention. The storage interconnect 38 may be a shared, public, or private network and encompasses a wide area or local area and can be implemented through any suitable combination of wired and/or wireless communication networks. Furthermore, the storage interconnect 38 may include a LAN, a WAN, an intranet, the Internet, or a set of switches. For example, in one embodiment, the storage interconnect 38 works with Fibre Channel connectivity and is implemented in the form of a storage area network (SAN). In another embodiment, the storage interconnect 38 works with internet protocol (IP) connectivity and is implemented via an Internet-Small Computer System Interface (iSCSI) (e.g., for Fibre Channel). Those of skill in the art will recognize that other implementations are, of course, possible.

Storage devices 40 may be any sort of storage equipment capable of connecting to storage interconnect 38. In some embodiments, each storage device 40 is a disk array. As is well-known in the art, a typical disk array includes a disk array controller, disk enclosures holding a plurality of disk drives, and a power supply. A disk array may also include a cache. Examples of disk arrays include the Symmetrix Integrated Cache Disk Array System and the CLARiiON Disk Array System, both available from EMC Corp. of Hopkinton, Mass.

In some embodiments, an external intermediate device 42 also attaches to host interconnect 34 and storage interconnect 38, for example, to provide a data de-duplication feature, or, in connection with WAN tunnel 44 and remote storage device 46, a remote replication feature. Additional detail is provided below.

As mentioned, key manager server 32 controls the generation, protection, storage, replacement, and elimination of data encryption keys. In particular, key manager server 32 creates encryption keys and corresponding key identifiers. Each key identifier, referred to as a key_id, is associated with a corresponding encryption key and can be used to obtain the key from the key manager server 32, provided that all permissions and credentials are in place.

Figure 2:
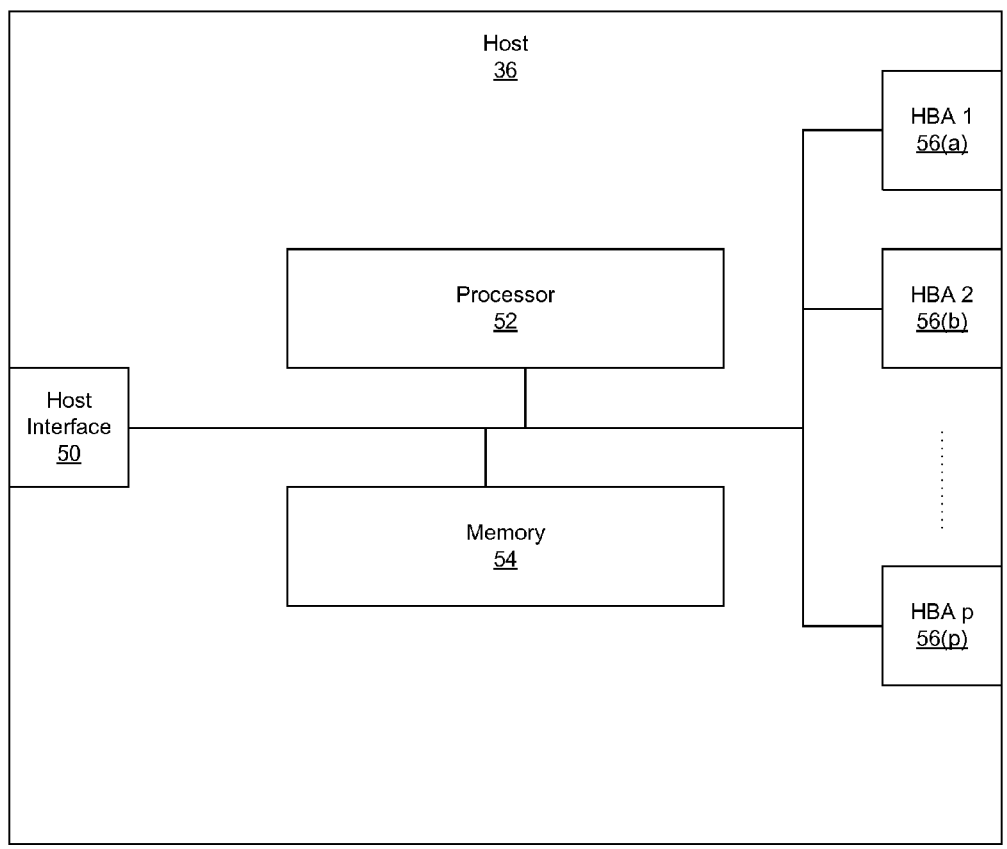
FIG. 2 depicts an example apparatus for use in practicing various embodiments of the invention.

FIG. 2 depicts a host 36 in greater detail. Each host 36 includes a host interface 50 for connecting to host interconnect 34, a processor 52, memory 54, and one or more host bus adapters (HBA) 56 (depicted as HBAs 56(a), 56(b), ..., 56(p)) for connecting to storage interconnect 38 over redundant paths. Processor 52 may be any sort of controller, such as, for example, a general purpose processor or microprocessor, a central processing unit, a set of multiple processing units, or a set of dedicated circuitry designed to perform particular operations in hardware. Memory 54 may be made up of one or more of the following: volatile random access memory, non-volatile read-only memory, non-volatile flash memory, magnetic storage, optical storage, etc. In some embodiments, one or more of the HBAs 56 are "encrypting" HBAs that perform encryption and decryption of storage data using dedicated hardware circuitry which is not shown in FIG. 2.

Figure 3:
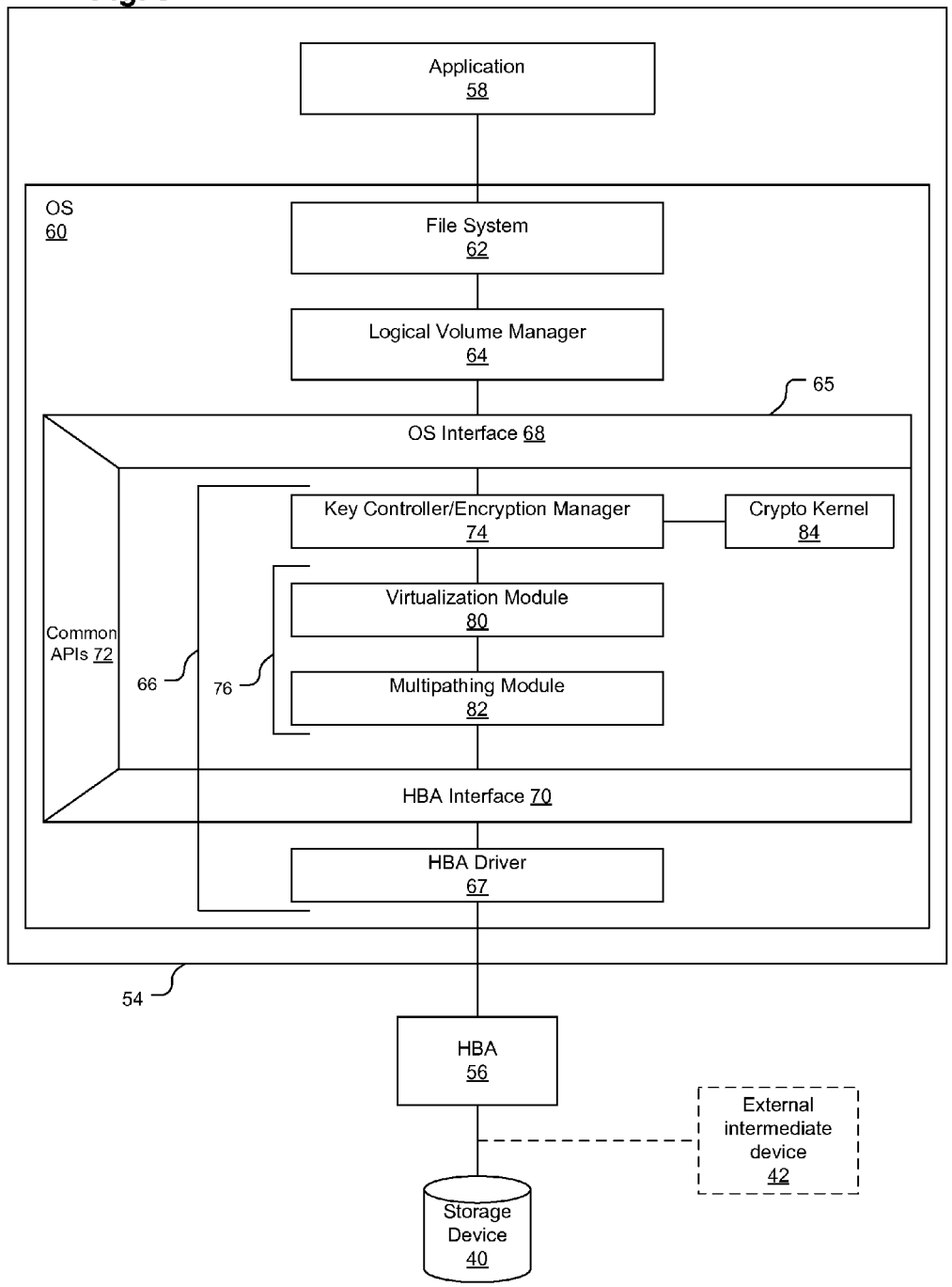
FIG. 3 depicts an example view of various components for use in practicing various embodiments of the invention.

FIG. 3 illustrates certain software that is contained within the memory 54 during system operation. As shown, in one embodiment, memory 54 stores one or more computer program applications 58 and an operating system (OS) 60. Applications 58 and OS 60 contain a set of instructions to be executed by processor 52. Memory 54 may also store application data.

OS 60 (which contains many well-known components that are not shown or described herein) includes a file system 62 and a logical volume manager 64. OS 60 also includes an input/output (I/O) filter driver 65 and an HBA driver 67. I/O filter driver 65 may be, for example, a component of the PowerPath Encryption With RSA software available from EMC Corp. of Hopkinton, Mass. I/O filter driver 65 includes an OS interface 68, an HBA interface 70, and a set of common application programming interfaces (APIs) 72. I/O filter driver 65 also includes a key controller module (KCM) or encryption manager 74 and one or more intermediate layers (IL) 76. ILs 76 may include, for example, one or more virtualization modules 80 and multipathing modules 82. Crypto kernel 84 may also be considered to be part of I/O filter driver 65. Portions of the I/O filter driver 65 and the HBA driver 67 may also make up storage I/O stack 66. It should be understood that this arrangement is by way of example only; in some embodiments, one or more components of the storage I/O stack 66 may be external to the I/O filter driver 65. In any case, for purposes of this Disclosure, the storage I/O stack 66 includes components between the KCM 74 and a software interface to the encryption endpoint (EE) where encryption is performed (e.g., HBA driver 67, or in some cases, a driver for external intermediate device 42).

The KCM 74 is generally responsible for managing the data encryption aspects of operation of the host 36 in which it resides. In some arrangements, the KCM 74 may arrange for the encryption to be performed by crypto kernel 84. However, since KCM 74 and crypto kernel 84 both run in software (running on processor 52), such operation may impose a performance penalty in terms of latency and/or throughput of data storage operations. Therefore, in some arrangements, KCM 74 is able to arrange for the encryption to be performed by a hardware encrypting circuit, referred to as a "hardware assist," which may be located within one or more HBAs 56 as mentioned above. An HBA 56 that includes a hardware assist may be referred to as an encrypting HBA or "EHBA", while an HBA 56 that does not include a hardware assist may be referred to as a non-encrypting HBA or "NHBA".

Figure 4:
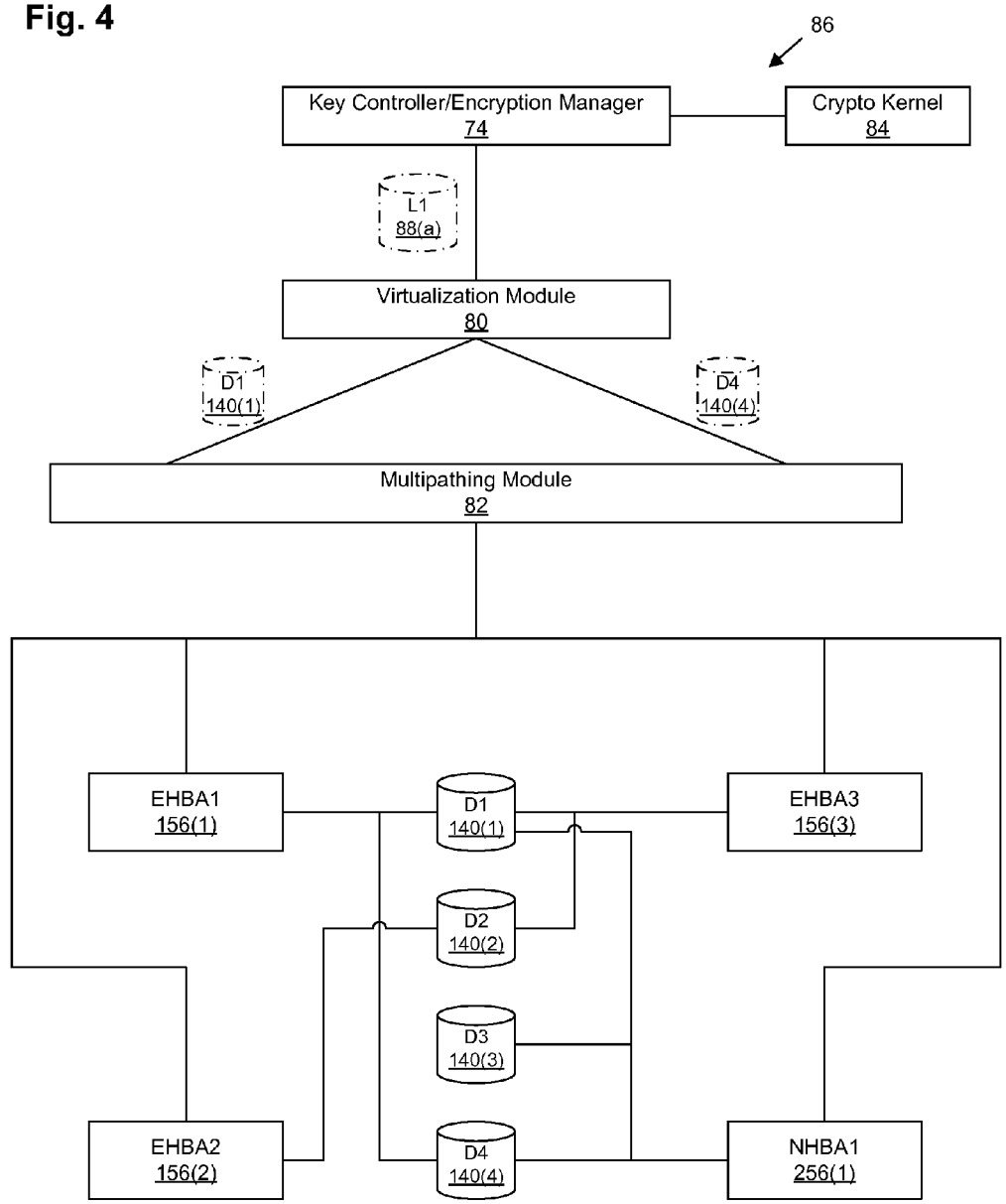
FIG. 4 depicts an example logical layout of a system for use in practicing various embodiments of the invention.

FIG. 4 depicts an example logical arrangement 86 of storage I/O stack 66 and other system elements according to one embodiment. In particular, FIG. 4 depicts functional connections within the storage I/O stack 66 and between the storage I/O stack 66 and certain disks of the storage devices 40 via respective HBAs 56. The disks 140(1)-140(4) are labeled D1-D4 respectively. The HBAs 56 are shown as EHBAs 156(1)-156(3) and an NHBA 256(1).

A logical disk L1 88(a) is defined by virtualization module 80. Virtualization module 80 provides a "virtualization" system function, presenting a logical unit of data (LU) as a logical disk or logical volume (LV) to KCM 64 and to the OS 60 via OS interface 68 even though the LV may not actually be a contiguous physical entity, which is assumed to result in assigning logical blocks of L1 to specific storage devices 40. This virtualization may be, for example, a mirroring, a striping, or some combination thereof. In arrangement 86, logical disk L1 88(a) is shown as being virtualized across two storage devices D1 140(1) and D4 140(4). It should be understood that, throughout this Description, the term LU is used to refer to a logical unit of data at any level of abstraction (e.g., as seen by the KCM 74, as seen by one of the ILs 76, or as seen by an HBA 56), while the term LV is used to specifically refer to an LU as seen by the KCM 74.

A multipathing module 82 provides a multipathing system function by which multiple paths to these storage devices are established through the storage interconnect 38 and utilized in operation for greater parallelism, availability, and performance. As depicted, multipathing module 82 connects to EHBA1 156(1), EHBA2 156(2), EHBA3 156(3), and NHBA1 256(1) (via the HBA driver interface 70 and HBA driver 67 of FIG. 3), and the following paths exist:

To D1 140(1) via EHBA1 156(1), EHBA3 156(3), and NHBA1 256(1)

To D2 140(2) via EHBA2 156(2) and EHBA3 156(3)

To D3 140(3) via NHBA1 256(1)

To D4 140(4) via EHBA1 156(1) and NHBA1 256(1).

It should be noted that FIG. 4 presents a simplified example which assumes that each HBA 56 and storage device 140 has only one connection to the storage interconnect 38. In general, as depicted in FIG. 1, each HBA 56 and storage device 140 may have multiple such connections, and it will be appreciated that the number of potential paths between a given HBA 56 and storage device 140 may be correspondingly greater.

In the configuration of FIG. 4, the only path to disk D3 140(3) is via NHBA1 256(1), which means that there is no hardware assisted encryption available for encrypting/decrypting data of that disk. The significance of this incapability is described below.

In an arrangement such as that of FIG. 4, the multipathing module 82 is responsible for maintaining an awareness of which disks 140 it can "reach" (engage in I/O operations with) as well as the corresponding set of usable paths to each reachable disk. The virtualization module 80 maintains an awareness of the disks (e.g., D1 140(1) and D4 140(4)) which underlie each logical volume (e.g., L1 88(*a*)). Upon receiving storage commands (I/O commands including reads and writes of storage data) directed to logical volume L1 88(*a*), the virtualization module 80 generates corresponding storage commands to D1 and D4 and issues these commands to the multipathing module 82. The multipathing module 82 responds by selecting a path for each command and issuing the command to the HBA 56 for the selected path. Storage commands directed to an encrypted region of a disk 140 may utilize the hardware assist provided by an EHBA 156 along a selected path. In the event that a disk 140 is not reachable via an EHBA 156 (such as disk D3 140(3) as mentioned above), any such storage commands will utilize the encryption functionality of the crypto kernel 84.

Figure 5A:
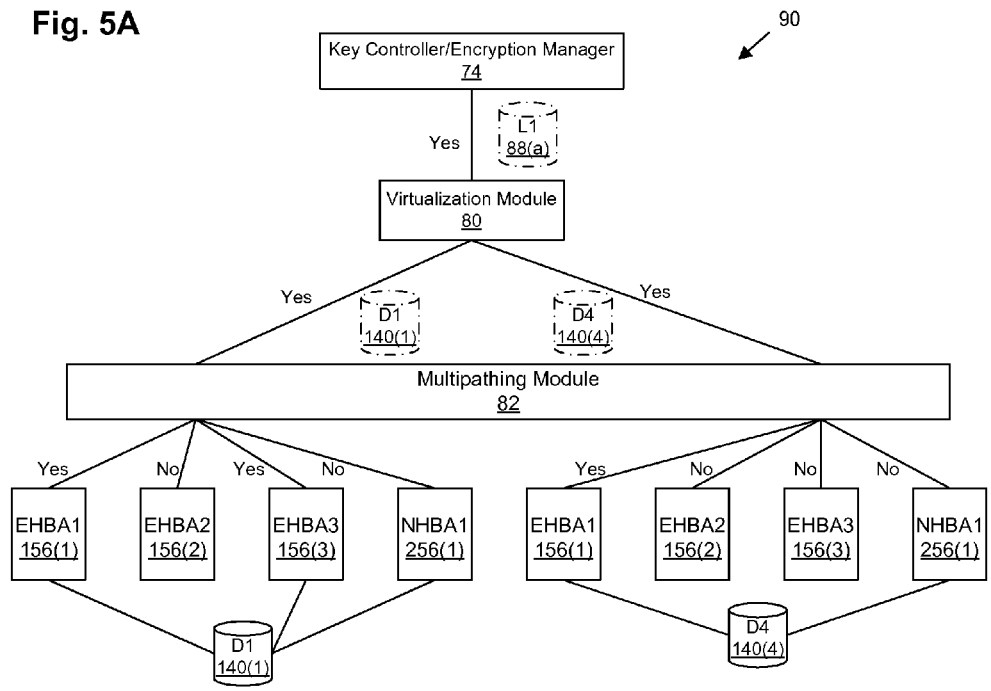
FIG. 5A depicts an example scenario according to one embodiment of the invention.
Figure 5B:
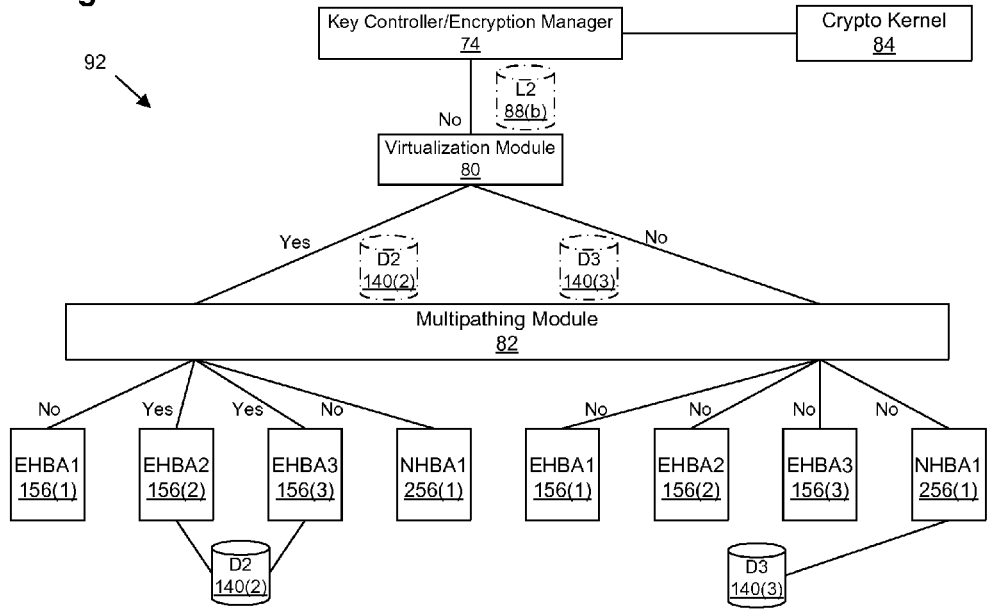
FIG. 5B depicts an example scenario according to another embodiment of the invention.

FIGS. 5A and 5B illustrate specific examples of the above-described operation in greater detail. FIG. 5A depicts one arrangement 90 for disks D1 and D4 of logical volume L1. The diagram shows that disk L1 88(*a*) may be encrypted using hardware assist, because each underlying storage device D1, D4 that L1 maps to can be accessed through an EHBA 156. Thus, since storage device D1 may be accessed via EHBA1 and EHBA3 (indicated by the "Yes" along the connections between multipathing module 80 and 156(1) and 156(3)), and D4 may be accessed through EHBA1 (indicated by the "Yes" along the connection between multipathing module 82 and 156(1)), a combination of EHBA1 and EHBA3 may be used to perform all encryption operations for accessing logical disk L1 88(*a*). It should be noted that although both storage devices D1 and D4 are accessible through NHBA1 256(1), a "No" is depicted along the connections between NHBA1 256(1) and multipathing module 82 because NHBA1 256(1) does not provide a hardware assist feature.

FIG. 5B depicts an alternate arrangement 92 for a second logical disk L2 88(*b*) and its underlying disks D2 140(2) and 140(3). As shown, disk D3 is accessed only via NHBA1 256(1). Therefore, encrypted storage operations for logical disk L2 88(*b*) do not utilize hardware assist, because not all of its component storage devices can be accessed by an EHBA 156. Thus, in arrangement 92, crypto kernel 84 is used to perform the encryption operations required by any data storage operations to be performed on logical disk L2 88(*b*).

The above description in connection with FIGS. 4 and 5A-5B illustrates certain important aspects of using hardware assisted encryption in a system such as that of FIG. 1. First, it must be possible for an EHBA 156 to obtain the encryption metadata (including encryption key) for those regions of encrypted storage for which that EHBA 156 will handle data storage commands, so that the hardware encryption circuitry of the EHBA 156 can perform the correct encryption/decryption operation using the correct key for each distinct region of storage. As the KCM 74 is the overall manager of encryption operations for the host 36 in which an EHBA 156 resides, a mechanism is needed to enable the KCM 74 to communicate the encryption metadata to its EHBAs 156. Additionally, a mechanism is needed for the KCM 74 to ascertain whether hardware assisted encryption is available for any given region of storage. Both these needs are further complicated by the presence of ILs 76, especially those (like virtualization module 80) which are "remapping" layers that effect a translation or mapping between two different representations of a given storage volume. Additionally, even non-remapping layers like the multipathing module 82 create potential problems, because hardware encryption assist may not be available on all paths for a given disk 140, yet the system must ensure that encryption is performed reliably. All these issues point to the need for a communications protocol among the different layers of the storage I/O stack 66 to support the data encryption function.

FIG. 6 depicts an example method 1000 for setting up encryption on a logical disk (e.g., logical disk L1 88(*a*)) and then performing encrypted storage operations in an efficient manner. FIG. 6 is directed to the specific case of hardware-assisted encryption, but several aspects of the method are more generally applicable to the use of other types of EEs, which perform cryptographic processing (e.g., encryption, decryption, or both), as explained below. In one embodiment the method is performed using an "in-band" communications protocol among the various components of the storage I/O stack 66. Here "in-band" refers to the fact that communication related to the method is performed along the same path as the I/O. In one embodiment, specialized SCSI commands and responses, for example, are transported up and down the storage I/O stack 66 using the same transport mechanism which is used to convey the SCSI commands that contain storage commands (reads and writes) and responses. In some embodiments, special commands are embedded in the SCSI buffer on a SCSI read command. This communications protocol is referred to below as a "DEK management protocol," where the acronym DEK stands for "data encryption key."

By "up and down" the storage I/O stack 66 it is meant that a DEK management protocol command may be created by KCM 74 then passed to a top-level IL 76, such as virtualization module 80. That IL 76 examines the command and, in most cases (exceptional cases are discussed below), will send one or more corresponding commands to the next IL 76 down the stack, such as multipathing module 82. This pattern repeats until one or more commands reach HBA driver(s) 67. Responses flow in the other direction, from the HBA drivers 67 upward to the KCM 74. In some cases, commands may not travel completely down the storage I/O stack 66, and responses may be generated and sent upwards by one or more ILs 76. By this chain-like communications mechanism, information required for proper encryption-related operation is shared among the various components of the storage I/O stack 66.

In one embodiment, KCM 74 uses the DEK management protocol to first determine whether or not there is an EHBA 156 (or a set of multiple EHBAs 156) that can provide hardware encryption for each encrypted region of the logical disk L1 88(a). If not, then it is deemed that hardware encryption is not available, and the KCM 74 assumes responsibility for encryption/decryption operations for the logical disk L1 using the crypto kernel 84. If the KCM 74 determines that such hardware encryption is available, it uses the DEK management protocol to provide the required encryption metadata to each EHBA 156 that requires it. Subsequently, storage commands directed to the logical disk L1 are sent down the stack 66 for execution, relying on operation of one or more EHBAs 156 for the data encryption/decryption part of operation for the encrypted regions.

As previously noted, encryption may be applied to separate "regions" of a given volume 88 or disk 140. Here "region" refers to a span of contiguous logical block addresses (LBAs). To illustrate the concept, assume a hypothetical simple volume 88 having 16 blocks of storage with addresses 0 through 15. The volume may have an encryption patterns as follows:

| LBA range | Encryption? |
|---|---|
| 0-3 | Not encrypted |
| 4-12 | Encrypted |
| 13-15 | Not encrypted |

The overall pattern for a given logical unit of data (LU) is referred to below as a "LUN map" (the term "LUN" is commonly used in the industry to refer to an LU). In operation, it is necessary for the KCM 74 to provide the LUN map for each volume to any EHBA 156 that will handle I/O for that volume. It is assumed herein that only one data encryption key is used for each volume, although in general it is possible to use different keys for different regions, for example.

In a somewhat more realistic example, an encrypted LU may store metadata and formatting information in plaintext form. In addition, certain additional regions of an encrypted LU may be designated as unencrypted for various reasons (e.g., to enhance performance on a region that is frequently accessed). For example, logical disk L1 88(a) may be an encrypted LU having a size of 10 megabytes. Given a 512-byte block size, logical disk L1 88(a) has 20,480 blocks. Blocks 0-1023 may be unencrypted and reserved for operating system use, while blocks 1024-1535 may be unencrypted and reserved for storing encryption metadata. Blocks 1536-10,239 may be encrypted, blocks 10,240-11,263 may be unencrypted for performance reasons, and blocks 11,264-20,479 encrypted. Thus, only blocks 1536-10,239 and 11,264-20,479 of logical disk L1 88(a) are subject to encryption.

Additionally, the virtualization module 80 distributes the blocks of logical disk L1 88(a) out across D1 140(1) and D4 140(4). For example, blocks 0-10,239 may be stored on D1 140(1), while blocks 10,240-20,479 are stored on D4 140(4). This arrangement places portions of logical disk L1 88(a) subject to encryption on both D1 140(1) and D4 140(4). It should be noted that the mapping between L1 and D1/D2 may not (and in many cases will not) preserve LBAs. Thus blocks 0-10,239 of L1 may be mapped to blocks 32,000-42,239 of D1, for example.

Referring again to FIG. 6, in step 1010, KCM 74 determines if there exist one or more EEs (e.g., EHBA(s) 156) that can perform encryption/decryption for all encrypted regions of an encrypted logical volume (LV). If step 1010 returns an affirmative response, execution proceeds with step 1050, while if step 1010 returns a negative response, execution may proceed with step 1070. At step 1070, it is concluded that there is no EE to perform encryption/decryption for the subject volume/disk, which means that any required encryption/decryption operations are to be performed by the KCM 74 using the crypto kernel 84. As described above with reference to FIGS. 5A and 5B, in the present example the condition of step 1010 is satisfied for logical disk L1 88(a). However, for logical disk L2 88(b), step 1010 evaluates in the negative because there is no encrypted path to D3 140(3), and thus the method will execute step 1070 with respect to logical disk L2 88(b). It should be noted that in some embodiments, even if an EHBA 156 is present in all paths to a storage device 40, condition 1010 could still fail if an essential path (or an essential group of paths) is blocked by an error in the EHBA 156 (e.g., the EHBA 156 has no remaining capacity or is temporarily offline).

As shown in FIG. 6, step 1010 may be accomplished by performing some or all of sub-steps 1012 and 1016, which perform handshake and query operations. In connection with these sub-steps, different specific commands and responses of the DEK management protocol are used as described more fully below. Table 1 provides a general structure for a DEK management protocol command block used in performing these operations:

TABLE 1

| Bytes | Field |
|---|---|
| | General command block format |
| 0-7 | (8 bytes) Protocol Signature |
| 8-15 | (8 bytes) Checksum |
| 16-19 | (4 bytes) Version |
| 20-23 | (4 bytes) Reserved |
| 24-27 | (4 bytes) DEK Management protocol Opcode |
| 28-31 | (4 bytes) DEK Management protocol Response Status |
| 32-39 | (8 bytes) DEK Management protocol Endpoint ID |
| 40-47 | (8 bytes) Key Controller Handle |
| 48-1535 | Command Specific Parameters and Data |

The general command block format is a structure having a format as shown in Table 1. In some embodiments, all commands are a maximum of 1536 bytes (3×512-byte blocks) long, although this is by way of example only. In some embodiments, DEK management protocol command blocks are implemented within the read buffer of SCSI Read commands. The fields and arguments are described below. In the description below, the label [In] means the parameter is an "input" passed from the KCM 74 in/down to the EE (via one or more ILs 76), while [Out] means the parameter is an "output" returned by the EE out/up to the KCM 74 (via one or more ILs 76). "Initiator" means the KCM 74 or cooperating IL 76 that generates a protocol command. "Device Object" means a device managed by a driver in the storage I/O stack 66. It may be a volume, an LV, an LU, a path device, or a storage device.

The following is a description of the various fields in the general command block shown in Table 1 above:

Protocol Signature—8 bytes—[In] identifies the contents as a DEK Management protocol Command, to distinguish DEK management protocol communications from other communications using the same in-band transport.

During the "Handshake" command of step 1012 (described below), the signature is set to a predefined value (e.g., 0x0a, 0x0b, 0x0c, 0x0d, 0x0e, 0x0f, 0x10, 0x11) by the KCM 74. The signature is echoed back unchanged by the EE for all commands.

Checksum—8 bytes—[In] Used as a means of validating a DEK management protocol command block. Contains a 32 bit cyclic-redundancy-check checksum of bytes 16 to 1535, stored in a longword. Calculated by the KCM 74 before sending the command down.

Version—4 bytes—[In] DEK Management protocol version identifier.

DEK management protocol Opcode—4 bytes—[In] DEK Management protocol operation to be performed. Opcodes includes values for Handshake, Query, Associate, Update, and Disassociate. If an EE had been doing encryption for a Device Object, it can release any resources associated with that object after a Disassociate command and can keep them released until it sees a new Associate command. Associations are described below.

DEK management protocol Response Status—4 bytes—[Out] Reports completion status for the protocol command. Set by the EE. Examined by the ILs 76 and potentially modified by them. Examined by the KCM 74. Valid values for this field can include Success as well as various values representing failure due to a number of possible errors.

DEK management protocol Endpoint ID—8 bytes—[In/Out] Unique identifier for the EE's use. Its content varies by Opcode: returned up to the KCM 74 on a Handshake and echoed (sent back down to) the EE in Query, Associate, Update, and Disassociate commands.

Key Controller Handle—8 bytes—[In] Contains a handle used by the Initiator to match a DEK management protocol response with its originating command. The EE and ILs 76 should echo/return this field unchanged.

Command Specific Parameters and data—Up to 1488 bytes of command-specific data. Examples are discussed below.

Referring again to FIG. 6, in step 1012 (which may be omitted), KCM 74 sends a Handshake command down to the next IL 76 in order to test for the existence of a cooperating EE in the storage I/O stack 66.

The KCM 74 sends the Handshake command as the first DEK management protocol command to a Device Object. Only one handshake at a time should be outstanding to a given device object. The EE should not trigger an internal state change upon receipt of a Handshake, e.g., a Handshake command should not reset associations currently in effect for a Device Object.

Generally, KCM 74 will send one Handshake command per LV that it manages. As long as KCM 74 receives one affirmative Handshake response command block in response to the Handshake command, KCM 74 will proceed to step 1016. Otherwise, KCM 74 will proceed with software encryption.

When a cooperating IL 76 receives a Handshake command from above in the storage I/O stack 66, it passes the command down to the next level down in the storage I/O stack 66. If the LU potentially involves multiple EEs of the storage I/O stack 66, then the IL will replicate the command block (potentially with modification as discussed below) and send a copy down the storage I/O stack 66 toward each such EE.

For example, if the IL 76 is a virtualization module 80 that virtualizes the LU across two storage devices 40(a) and 40(b), then virtualization module 80 sends two copies of the Handshake command block down the storage I/O stack 66, one referencing storage device 40(a) as the device object, and the other referencing storage device 40(b) as the device object. If the virtualization module 80 receives any affirmative Handshake response command blocks, the virtualization module 80 responds back to the KCM 74 with an affirmative response. This indicates to the KCM that there is at least one EE that may require encryption metadata. However, it should be understood that in some embodiments, some ILs 76 may be configured to respond negatively if any of the Handshake response command blocks from below are negative.

The DEK management protocol supports multiple "classes" of EEs. An EE of a cooperating class ignores Handshake commands that do not contain its class name and acknowledges a Handshake addressed to its EE class name by filling in the Endpoint ID field.

See Table 2, below, for an example layout of a Handshake command block with Handshake-specific definitions of bytes 48-1535.

TABLE 2

Handshake command block format

| Bytes | Field |
|---|---|
| 0-7 | Protocol Signature |
| 8-15 | Checksum |
| 16-19 | Version |
| 20-23 | Reserved |
| 24-27 | Handshake Opcode |
| 28-31 | DEK management protocol Response Status |
| 32-39 | DEK management protocol Endpoint ID |
| 40-47 | Key Controller Handle |
| 48-303 | (256 bytes) Encryption Endpoint Class Name |
| 304-511 | (208 Bytes) Reserved |
| 512-1023 | (512 Bytes) Pseudo-random bytes |
| 1024-1151 | (128 Bytes) Reserved |
| 1152-1407 | (256 Bytes) Pseudo-random bytes |
| 1408-1535 | (128 Bytes) Reserved |

The following is a description of the various fields in the Handshake command block shown in Table 2 above:

DEK management protocol Endpoint ID—8 bytes—[Out] Returned by the EE and for its internal use: the KCM 74 echoes (and thus addresses) this Endpoint ID in subsequent Query, Associate, and Disassociate commands for the Device Object. (An IL 76 creating a protocol command would use this Endpoint ID to address the EE.)

Endpoint Class Name—256 bytes—[In] Each class of EE has a name, expressed, for example, as a null-terminated ASCII string. Example endpoint class names include: "EHBA" for an HBA 56 with hardware assist (i.e., an EHBA 156); "DDM" for a data de-duplication module, which is typically an external intermediate device; and "RRM" for a remote replication module, which is typically an external intermediate device.

Pseudo-random bytes [512-1023]—512 bytes—[In/Out] "Handshake" region #1 is filled with pseudo-random data by the KCM 74 and sent down to the EE. The EE signals its presence in the storage I/O stack 66 to the KCM 74 by, for example, reversing the order of all 512 bytes in this region. This field is passed through untouched by ILs 76, although if multiple Handshake response command blocks are received from below, the IL 76 will choose the field from the appropriate received Handshake response command block to indicate affirmative or not, as appropriate. This field may also be generated by an IL that creates a command.

Pseudo-random bytes [1152-1407]—256 bytes—[In/Out] "Handshake region #2 is similar to "handshake" region

1. The Encryption Endpoint reverses all 256 bytes in this region before returning a response to the command.

Reserved bytes [20-23, 304-511, 1024-1151, 1408-1535]—468 bytes—Undefined. Reserved for future use. Set to 0x00 by the KCM 74, ignored by the IL 76 and EE. These bytes are covered by the checksum. An IL 76 should not overwrite them. They are included in checksum to guard against false positive of a SCSI or other I/O command being interpreted as a DEK management protocol command.

The EE is expected to update the version field if the version supported by EE is different than requested by KCM 74. The ILs 76 are also expected to ensure version compatibility with the EE. If the EE supports a lower version than required by the IL 76, IL 76 should fail the Handshake request.

Referring again to FIG. 6, in step 1016, KCM 74 sends a Query command down to the next IL 76 to determine if an encryption capability such as hardware assisted encryption is supported for a specified range on an LV. Each IL 76 between the KCM 74 and the EE responds to the Query based on the encryption capabilities of the underlying devices.

An IL 76 broadcasts the Query command to all the underlying devices and aggregates the results of individual queries into one response to the KCM 74 (or an IL 76 above it). The response from an IL 76 should not lead to data corruption. For example, an IL managing a virtual volume spanning two underlying LUs should support hardware assisted encryption on the virtual volume only if the paths to both the LUs have hardware assist available.

For example, if the IL 76 is a virtualization module 80 that virtualizes a logical volume across two storage devices 40(*a*) and 40(*b*), then virtualization module 80 sends two copies of the Query command block down the storage I/O stack 66, one referencing storage device 40(*a*) as the device object, and the other referencing storage device 40(*b*) as the device object. Generally, only if the virtualization module 80 receives affirmative Query response command blocks for both storage devices 40(*a*) and 40(*b*) will the virtualization module 80 respond back to the KCM 74 with an affirmative response, however, this behavior may differ if a particular form of virtualization is performed that allows otherwise. For example, in the case of a read-only LV mirrored onto two or more distinct LUs, as long as one of the LUs is readable with encryption at the level of an EHBA 156, the virtualizing IL may return an affirmative response, even if a negative response is returned for one of the LUs.

As an alternate example, if the IL 76 is a multipathing module 82 having paths through multiple HBAs 56 to a given storage device 40, then the multipathing module 82 sends copies of the Query command block to all such HBAs down the storage I/O stack 66. If the multipathing module 82 receives any affirmative Query response command blocks, the virtualization module 80 respond back to the KCM 74 with an affirmative response.

An EE looks for the Endpoint ID in the payload that matches its ID (i.e., the Endpoint ID that is sent up by the EE to the KCM 74 in the Handshake response), and returns affirmatively if it can perform its encryption capabilities on the specified ranges for the device object. Otherwise the EE may return in the negative (e.g., if the EE does not have a connection to the appropriate storage device 40, if the EE was not initialized, or if the EE is temporarily busy and the command should be retried).

Included within the Query command is a LUN Map, which defines the areas subject to encryption. Each area is provided with reference to a Logical Block Address (LBA), which is an abstraction of the block addresses at a given layer of logical abstraction. Returning to the example provided above in which logical disk L1 88(*a*) is an encrypted LV 10 megabytes in size, blocks 1,536-10,239 and 11,264-20,479 of logical disk L1 88(*a*) would be listed as subject to encryption.

Some ILs 76 may remap the LUN map as appropriate. These ILs 76 are referred to as "remapping" ILs 76. For example, a virtualization module 80 is an example of a remapping IL 76, while a typical multipathing module 82 is not a remapping IL 76. Recall that, in the example, blocks 0-10,239 of logical disk L1 88(*a*) are stored on D1 140(1), while blocks 10,240-20,479 are stored on D4 140(4). Further suppose that the encrypted blocks stored on D1 140(1) begin at local block 1,000,000, while the encrypted blocks stored on D4 140(4), begin at local block 2,097,152, but actually are spread out across 2 ranges: 2,097,152-2,101,759 and 3,145,728-3,150,335. Therefore, in the Query command passed on to storage device D1 140(1), the LUN Map will indicate LBAs 1,000,000-1,008,703; and in the Query command passed on to storage device D4 140(4), the LUN Map will indicate LBAs 2,097,152-2,101,759 and 3,145,728-3,150,335.

See Table 3, below, for an example layout of a Query command block.

TABLE 3

Query command block format

| Bytes | Field |
|---|---|
| 0-7 | Protocol Signature |
| 8-15 | Checksum |
| 16-19 | Version |
| 20-23 | Reserved |
| 24-27 | Query Opcode |
| 28-31 | DEK management protocol Response Status |
| 32-39 | DEK management protocol Endpoint ID |
| 40-47 | Key Controller Handle, Undefined |
| 48-71 | (24 bytes) Undefined |
| 72-75 | (4 bytes) LUN Map Count |
| 76-83 | (8 bytes) Starting LBA Entry [0] |
| 84-91 | (8 bytes) Number of Blocks [0] |
| 92-99 | (8 bytes) Starting LBA Entry [1] |
| 100-107 | (8 bytes) Number of Blocks [1] |
| 108-1019 | LBA Range Structures [2] to [58] |
| 1020-1027 | (8 bytes) Starting LBA Entry [59] |
| 1028-1035 | (8 bytes) Number of Blocks [59] |
| 1036-1535 | Reserved |

The following is a description of the various fields in the Query command block shown in Table 3 above:

DEK management protocol Endpoint ID—8 bytes—[In] Returned by the EE in the Handshake command response, echoed back by KCM 74, thus addressing the Endpoint ID.

Undefined bytes [48-71]—24 bytes—[In/Out] Undefined, can be anything. Included in checksum.

LUN Map Count—4 bytes—[In] Number of valid LUN Map entries being queried. Must be at least one and not greater than the total entries that can fit in the read buffer, (e.g., 60.) The IL 76 validates the map.

LUN Map Entry—16 to 960 bytes (up to 60 16-byte structures)—[In] The LUN map is a list of LBA ranges on the LU. Each LUN Map entry contains 2 sub-entries, each of which is, for example, a 64-bit integer: a starting LBA; and a number of blocks. Any remapping IL 76 can adjust the starting LBA and/or number of blocks as the request for association flows down the stack.

Reserved bytes [1036-1535]—Undefined and reserved for future use.

Recall that, if step 1010 returns an affirmative response, execution proceeds with step 1050, while if step 1010 returns a negative response, execution may proceed with step 1070. In some embodiments, step 1050 may also be executed on its own, without first performing step 1010.

In step 1050, KCM 74 sends encryption metadata associated with the encrypted LV from the KCM 74 to the EE via ILs 76, the encryption metadata identifying an encryption key and one or more encrypted regions of the LV. The encryption metadata may also identify other associate encryption information needed to perform the encryption algorithm, such as, for example, an identification of the encryption algorithm. The sending results in establishment of one or more shared associations between the KCM 74 and the EE, the shared associations associating the encrypted LV with the encryption metadata for the encrypted LV. In one embodiment, this step is accomplished using the DEK management protocol by sending a DEK Management Associate command.

The Associate command creates an association of (1) an Encryption Key Blob, with (2) a LUN Map on (3) a Device Object, thereby effectively turning on encryption for the LU and LBA Range(s). The Key Blob is a set of encryption metadata, storing the key and all the other information needed to perform encryption/decryption that is stored on the key manager, as described below. Although in the on-host case, the key blob is sent within the Associate command, in an off-host case, the key ID may be sent within the Associate command instead of the key blob (or, in some embodiments, an encrypted version of the key blob, referred to as a "wrapped" key blob, may be sent). Multiple Key Blob/LUN Map Associations can be made for a Device Object. Associate commands can be generated by the KCM 74 and by ILs 76, although ILs 76 do not originate an association, but rather pass on one or more copies (with modifications as necessary) of an Associate command received from above. In some cases, the association may also include Application information.

There are two forms of an Associate command:
New Association—creates a new association. In the case of a new association, the Associate command block arrives at the EE or IL 76 with a Null "Association Handle" (see below). This tells the EE/IL 76 that this association does not currently exist, that it should be created and that an Association Handle reference should be created and returned in the Associate response.
Refresh Association—the Refresh Association originates from the KCM 74 and exists for the benefit of the ILs 76 or the EE. In the case of a Refresh Association, the Associate command block arrives at the EE or IL 76 carrying the Association Handle created by the EE (or an IL 74) as part of a preceding initial association.

An EE should respond as follows for the different Association types/association handle values:
If the Association Handle is NULL—it means the KCM 74 or an IL 76 is creating a new Association, so the EE should:
Validate the parameters as needed (see below).
Create the Association.
Return a Handle for the Association.
If the EE already has an association, provided there is no range overlap, it should ignore the existing association and treat the request as a new association.
If the Association Handle is not Null—it means the Association exists, so the EE should:
If the Associate carries the same LUN Map and Key Blob specified in the original Associate, then return Success status.
Else—something is wrong, this should not happen—so respond negatively by returning an Association Exists status.

Any Associate command (whether the first or a repeat) should be preceded by a Query command—though the EE does not need to enforce this.

FIG. 7 shows an example layout of an Associate command block. The following is a description of the various fields in the Associate command block shown in FIG. 7:

DEK management protocol Response Status—4 bytes—[Out] possible returns are Success, Invalid HW State, No Memory, Busy, Invalid Range, Invalid Key, Association Exists, Association Overflow.

DEK management protocol Endpoint ID—8 bytes—[In] Echoed from the EE's response to the initial Handshake command. Address of the EE for the Associate. The EE passes on an Associate command that does not contain the EE's Endpoint ID.

Association Handle—8 bytes—[In/Out]
[In] Zero—first time Association. An Association Handle is returned by the EE or IL 76. The handle is an internal value used by the EE or IL 76 for accessing an association. The Association Handle is subsequently passed back down by the KCM 74 to the EE in Update and Disassociate commands. An EE assigns a unique association handle for each association created. ILs 76 may need to replace the association handles based on their internal device mappings, so that a single handle is returned to the KCM 74. An IL 76 keeps track of the handle(s) returned from below it and uses those handles for passing down any subsequent Associate or Disassociate command.
[In] Non-zero implies KCM 74 is attempting to refresh an existing association. When dispatching it to the newly discovered devices, the ILs 76 should zero out the association handle and replace the handle with the new handle on the way up to KCM 74.

Data Encryption Key Parameters—
The association handle is followed by offsets to various data items 304:
Key Blob 304 (4 bytes) (offset shown as 302 in FIG. 7)
Key ID (4 bytes) (offset shown as 306 in FIG. 7)
Application Info (4 bytes) (offset shown as 308 in FIG. 7)
LUN Map (4 bytes) (offset shown as 310 in FIG. 7)
These offsets 302, 306, 308, 310 are followed by the following variable length parameters:
Key Blob 304
Key Blob Length—4 bytes[In]—The number of bytes in the key blob
Key Blob Type—1 byte [In]—This field indicates whether the format of the key blob is "wrapped" (i.e., encrypted, as, for example, it may be when being sent off-host to an external intermediate device 42 or when being sent within a highly-secure system) or "unwrapped" (i.e., unencrypted, as for example, it may be when being sent to an EHBA 156 within the host 36).
Key Data
Key Data Version—1 byte [In]—Versioning information for the key data
Key Data Length—1 byte [In]—Length of the symmetric key
Key Algorithm—1 byte [In]—Algorithm
Key Mode—1 byte [In]—Algorithm Mode
Key Data—64 bytes [In]—Carries the key data of the length "Key Data Length". Extra bytes, if any are, zero.
Application info size—1 byte—[In] maximum accepted size of the application information.

Key ID
  Key ID Length—4 bytes [In]—Number of bytes in key ID
  Key ID bytes—[In]—Key ID bytes
LUN Map Count—4 bytes [In]—Number of valid LUN Map entries being reported. It should be at least one. Implementations can restrict the number of LUN map entries supported.
LUN Map Array—16 to 960 bytes (up to 60 16-byte structures)—[In] Specifies the LBA ranges on the Device Object to associate with the Key Blob 304 or Key ID. Sub-fields include starting LBA and a length or LBA-count. Unused map entries are set to zero.
Reserved bytes [variable-1535]—Unused and undefined Upon successful completion of an Associate during step 1050, an EE is ready to apply encryption/decryption to the encrypted regions of a LU as defined in the LUN map, using the encryption metadata from the Key Blob and the application information. As long as the association remains active, subsequent read/write commands directed to these regions employ decryption/encryption using the encryption metadata. This operation is depicted in step 1060.

The DEK management protocol may also employ Update and Disassociate commands. An Update command tells the EE to update the association for the Device Object with the Key Object and LUN map information in the protocol command block. It provides an atomic way for an EE to effectively delete and create an association in one step. It would be used, for example, to support resizing of an encrypted LU.

The Disassociate Command deletes the association that had been created with a previous Associate command for a Device Object. Subsequent read and write commands in the LBA range(s) covered for that association are no longer encrypted/decrypted by the EE. Disassociate is used when the EE can no longer perform its duties and a switch to encrypting using the crypto kernel 84 is needed. Switching back happens through a new Associate command. An example, looking back at FIG. 4, would be if EHBA1 failed for some reason. D1 and D4 would still be reachable by EHBA3 and NHBA1, respectively, but the Crypto kernel 84 would have to be used so the Disassociate would be sent on L1.

Both the Update (which, in some embodiments, is an Associate command containing a valid non-null handle) and Disassociate commands include an Association Handle to identify the subject association.

In some embodiments, the invention may be applied to the sharing of encryption metadata with an external encryption endpoint such as the external intermediate device 42. FIG. 8 depicts a method 1100 which may be performed by an external intermediate device 42. At step 1110, key identification information (e.g., the key ID) is retrieved from a key controller module (e.g., KCM 74) on an external host (e.g., host 36). At 1120, a key which is identified by the key identification information is obtained from an external key server (e.g., key manager server 32). In some embodiments, this is done by sending the key ID from the external intermediate device 42 to key manager server 32, which then responds by sending key blob to external intermediate device 42 securely across host interconnect 34. The key is sent indirectly in this manner because security restrictions typically prevent an encryption key from being sent off-host. The key must be retrieved separately from the key manager server 32 in order to enforce access limitations. In some cases, it may be possible to instead send the key directly to the external intermediate device 42 if it is embedded within an encrypted "wrapped" key blob. It should be understood that, in some embodiments, step 1110 may be performed using a command similar to the Associate command depicted in FIG. 7, however, the key blob 304 would be either omitted from the command block or sent in wrapped format.

At step 1130, the key is used for encrypting/decrypting data, and, at step 1140, the encrypted/decrypted data is processed appropriately.

Two specific examples are shown in FIG. 8. In one case, the external intermediate device 42 provides a remote replication function to replicate storage volumes on a remote storage device 46. To make efficient use of long-distance communications bandwidth, it is desirable to compress the data prior to transmitting it. However, encrypted data benefits very little from compression, because encryption generally removes the large redundancy that is present in cleartext data which is exploited by compression techniques. Thus, the external intermediate device 42 in this case first reads and decrypts data of a local storage device 40 which is being replicated (step 1130), compresses the decrypted data (step 1142), encrypts the compressed data (1144) and then sends the encrypted, compressed data across the tunnel 44 to the remote storage device 46 (1146). In the event of needing to retrieve data from the remote storage device 46 for local use, the external intermediate device 42 performs these operations in reverse.

Steps 1152-1156 depict a set of similar operations for so-called "data de-duplication", a function that also exploits redundancy and thus is better performed on cleartext rather than encrypted data.

It should be understood that in either the remote replication case or the data de-duplication case the external intermediate device 42 may alternatively receive the encrypted data directly from an HBA 56 (e.g., via storage interconnect 38) rather than by reading it from a storage device 40.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method of operating a host in an encrypted data storage system, comprising:
    sending encryption metadata associated with an encrypted logical volume (LV) from a key controller module to an encryption endpoint via a storage input/output (I/O) stack of the host, the encryption metadata identifying an encryption key and one or more encrypted regions of the LV, the sending resulting in establishment of one or more shared associations between the key controller module and the encryption endpoint, the shared associations associating the encrypted LV with the encryption metadata for the encrypted LV; and performing a data storage operation on an encrypted region of the encrypted LV by sending a data storage command from the key controller module to the encryption endpoint via the storage I/O stack, the encryption endpoint using the encryption metadata associated with the encrypted LV to cryptographically process data of the data storage operation.

2. The method of claim 1, wherein the sending and performing are performed only upon successfully determining that the encryption endpoint exists and is able to cryptographically process the data of the data storage operation.

3. The method of claim 2, wherein determining includes:
sending a query command from the key controller module to the storage I/O stack, the query command including:
an opcode field set to a value that indicates that a query is to be performed; and
a set of fields identifying a set of ranges of the LV associated with that LU subject to encryption; and
receiving a query response to the query command at the key controller module, the query response having a response field set to a value that indicates whether all ranges of the set of ranges of the LV can be cryptographically processed by the encryption endpoint.

4. The method of claim 3, wherein determining further includes, prior to sending the query command:
sending a handshake command from the key controller module to the storage I/O stack, the handshake command including:
an opcode field set to a value that indicates that a handshake is to be performed; and
a handshake field containing a set of pseudo-random data bytes; and
receiving a handshake response at the key controller module in response to the handshake command, the handshake response including:
a response field set to a value that indicates whether one or more encryption endpoints exists; and
a handshake response field, the handshake response field containing the set of pseudo-random data bytes with a specific modification if and only if one or more encryption endpoints exists.

5. The method of claim 3 wherein sending encryption metadata includes, after receiving the query response:
sending an associate command from the key controller module to the storage I/O stack, the associate command including:
an opcode field set to a value that indicates that the establishment of an association is being attempted; and
a key blob, the key blob including:
an encryption key to be used in performing encrypted data storage operations on the LV; and
an indication of an encryption algorithm to be used in performing encrypted data storage operations on the LV; and
receiving an associate response at the key controller module in response to the associate command, the associate response including:

a response field set to a value that indicates whether the association has been successfully established; and
a handle field set to a handle value identifying the established association.

6. The method of claim 5, wherein the associate command further includes a set of fields, the set of fields identifying a set of ranges of the LV subject to encryption.

7. The method of claim 3, wherein sending the encryption metadata associated with the LV from the key controller module to the encryption endpoint via the storage I/O stack of the host includes sending the encryption metadata from the key controller module to an intermediate layer of the storage I/O stack.

8. The method of claim 7, wherein:
the intermediate layer is a virtualization module for virtualizing the LV across a plurality of LUs; and
determining further includes, at the intermediate layer:
for each LU of the plurality of LUs:
modifying a copy of the query command by altering the set of fields to:
include references to only ranges of the LV associated with that LU; and
identify ranges of the LU that correspond to the ranges of the LV associated with that LU instead of identifying ranges on the LV;
sending the modified copy of the query command to a lower-level layer of the storage I/O stack; and
receiving, from the lower-level layer, a low-level query response, the low-level query response having a response field set to a value that indicates whether all ranges of the altered set of ranges of the LU can be cryptographically processed by one of the encryption endpoints; and
if the response field of the low-level query response for each LU is affirmative, setting the response field of the query response to affirmative, otherwise setting the response field of the query response to negative;
sending the query response to the key controller module.

9. The method of claim 8, wherein the lower-level layer is a multipathing module for directing commands directed to one storage device to a plurality of paths toward that one storage device.

10. The method of claim 8, wherein the lower-level layer is a host bus adapter driver for interfacing with a host bus adapter, the host bus adapter functioning as the encryption endpoint.

11. The method of claim 8, wherein the lower-level layer is another virtualization module for virtualizing the LU across a plurality of lower-level LUs.

12. The method of claim 7, wherein:
the intermediate layer is a multipathing module for directing commands directed to one storage device to a plurality of paths toward that one storage device; and
determining further includes, at the intermediate layer:
for each path of the plurality of paths:
sending a copy of the query command to a lower-level layer of the storage I/O stack; and
receiving a low-level query response from the lower-level layer, the low-level query response having a response field set to a value that indicates whether all ranges of the set of ranges of the LV can be cryptographically processed by an encryption endpoint associated with that path;
if the response field of the low-level query response for any path of the plurality of paths is affirmative, setting the response field of the query response to affirmative, otherwise setting the response field of the query response to negative; and sending the query response to the key controller module.

13. The method of claim 12, wherein the lower-level layer is a host bus adapter driver for interfacing with a host bus adapter, the host bus adapter functioning as the encryption endpoint.

14. The method of claim 1, wherein:
the encryption metadata identifies the encryption key and the one or more encrypted regions of the LV by providing the encryption key and a map of the one or more encrypted regions; and
the encryption endpoint is within the host.

15. The method of claim 14, wherein sending the encryption metadata associated with the LV from the key controller module to the encryption endpoint via the storage I/O stack of the host includes sending the encryption metadata from the key controller module to an intermediate layer of the storage I/O stack.

16. The method of claim 1, wherein:
the encryption metadata identifies the encryption key and the one or more encrypted regions of the LV by providing key identification information for identifying a key used to encrypt the encrypted LV; and
the encryption endpoint is on an external device.

17. The method of claim 16, wherein sending the encryption metadata associated with the LV from the key controller module to the encryption endpoint via the storage I/O stack of the host includes sending the encryption metadata from the key controller module to an intermediate layer of the storage I/O stack.

18. An apparatus comprising:
a set of host bus adapters for communicating with a set of storage devices, at least one host bus adapter including an encryption endpoint;
memory, the memory storing encryption metadata associated with an encrypted logical volume (LV), the encryption metadata identifying an encryption key and one or more encrypted regions of the LV; and
a processor, the processor being configured to:
send the encryption metadata from a key controller module, stored in memory and running on the processor, to the encryption endpoint via a storage I/O stack, stored in memory and running on the processor, the sending resulting in establishment of one or more shared associations between the key controller module and the encryption endpoint, the shared associations associating the encrypted LV with the encryption metadata for the encrypted LV; and
perform a data storage operation on the encrypted LV by sending a data storage command from the key controller module to the encryption endpoint via the storage I/O stack, the encryption endpoint using the encryption metadata associated with the encrypted LV to cryptographically process data of the data storage operation.

19. The apparatus of claim 18, wherein:
the processor, when sending the encryption metadata associated with the LV from the key controller module to the encryption endpoint via the storage I/O stack of the host, is configured to send the encryption metadata from the key controller module to an intermediate layer of the storage I/O stack; and
the processor is configured to send and perform only upon successfully determining that the encryption endpoint exists and is able to cryptographically process the data of the data storage operation.

20. The apparatus of claim 19, wherein the processor, when determining, is configured to:
send a query command from the key controller module to the intermediate layer, the query command including:
an opcode field set to a value that indicates that a query is to be performed; and
a set of fields identifying a set of ranges of the LV subject to encryption; and
receive a query response to the query command at the key controller module, the query response having a response field set to a value that indicates whether all ranges of the set of ranges of the LV can be cryptographically processed by the encryption endpoint.

21. The apparatus of claim 20, wherein the processor, when sending the encryption metadata, is configured to, after receiving the query response:
send an associate command from the key controller module to the intermediate layer, the associate command including:
an opcode field set to a value that indicates that the establishment of an association is being attempted; and
a key blob, the key blob including:
an encryption key to be used in performing encrypted data storage operations on the LV; and
an indication of an encryption algorithm to be used in performing encrypted data storage operations on the LV; and
receive an associate response at the key controller module in response to the associate command, the associate response including:
a response field set to a value that indicates whether the association has been successfully established; and
a handle field set to a handle value identifying the established association.

* * * * *